J. C. Whitin.
Bolster for Spinning Mach.

N° 43,059.    Patented Jan. 7, 1864.

Witnesses
Henry B. Osgood.
P. W. Dudley.

Inventor
John C. Whitin

J. C. Whitin.
Bolster for Spinning Mach.
N°43,059.  Patented Jun. 7, 1864.
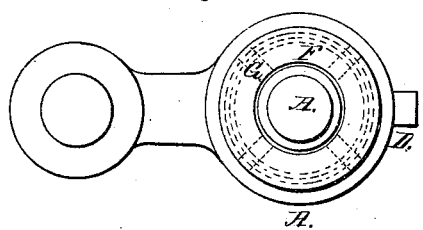
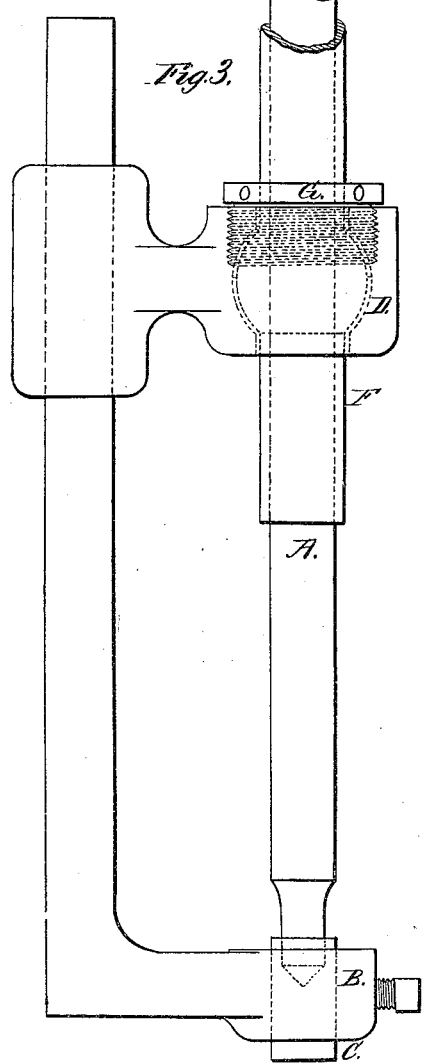
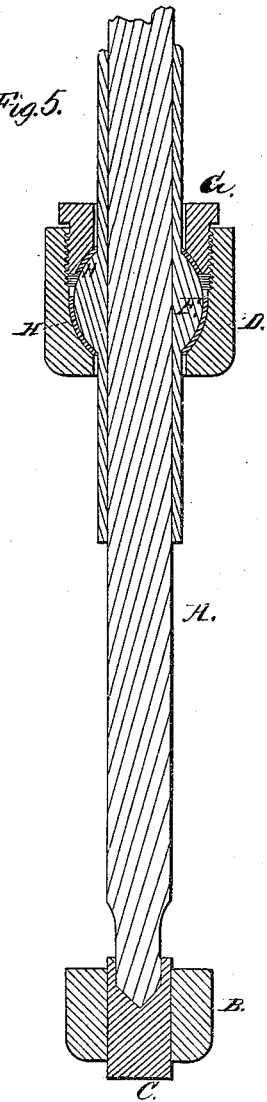
Witnesses.
Henry B. Osgood.
P. H. Dooley.
Inventor.
John C. Whitin

UNITED STATES PATENT OFFICE.

JOHN C. WHITIN, OF NORTHBRIDGE, MASSACHUSETTS.

IMPROVEMENT IN SPINDLE-BOLSTERS FOR SPINNING-MACHINES.

Specification forming part of Letters Patent No. 43,059, dated June 7, 1864.

*To all whom it may concern:*

Be it known that I, JOHN C. WHITIN, of Northbridge, in the county of Worcester and State of Massachusetts, have invented a new and Improved Upper Bearing for the Spindles of Speeder and Fly Frames; and I do hereby declare that the following is a correct description of the same, reference being had to the annexed drawings, making part of this specification, and to the letters of reference thereon.

Figure 2:
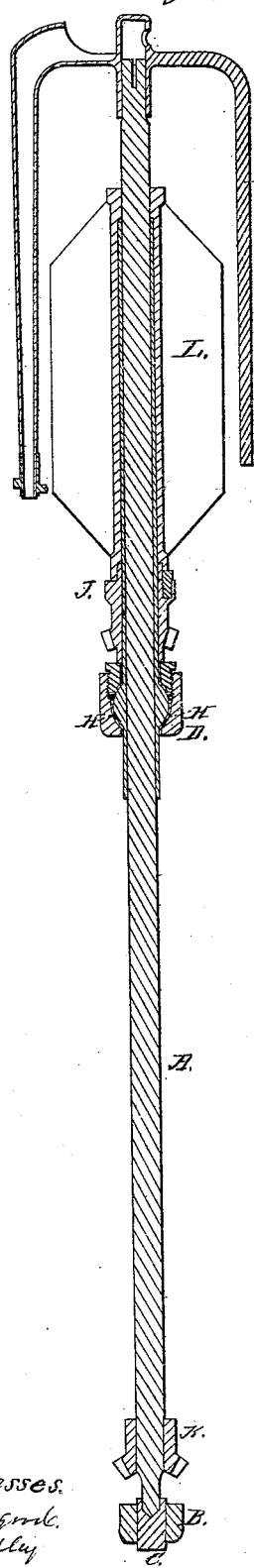
Figure 1:
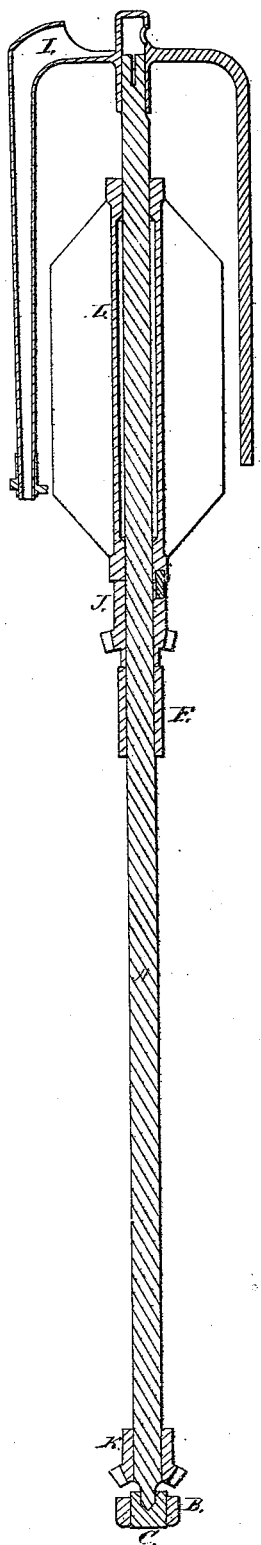

Figure 1 is a vertical section showing a spindle, &c., of a fly-frame as commonly used, one-half size. Fig. 2 is a vertical section showing a spindle of a fly-frame, with my improvement applied to it, one half size. Fig. 3 is a sectional elevation of a spindle, &c., with my improvement, full size. Fig. 4 is a plan of the same. Fig. 5 is a section at line A B.

The nature of my invention consists in providing for the upper parts of spindles of roving-machines bearings which steady the spindle when revolving, and, as they rise and fall on the spindle, accommodate themselves to it, and thus prevent binding. The common way of making the upper bearings was by fixing them firmly to the bobbin or bolster-rail; but it is difficult to get all the bolsters exactly perpendicular from the steps, and they often bind. This trouble, added to the shortness of the bearing, the difficulty of getting the fliers perfectly balanced, and the friction of the gear which carries the bobbin against the spindle, caused the spindle to wear and become loose and noisy. To avoid the wear, long tubes are used, reaching nearly to the top of the spindle, steadying it, and the gear is made to turn upon the tube or bolster instead of the spindle. The greater liability to bind is the objection to this bolster, for, being fixed to the bobbin-rail, it cannot accommodate itself to the spindle if they vary from the perpendicular. Should the bolster and spindle be at the same angle from the perpendicular, at the extremity of its downward traverse, they will not be when the bolster-rail is up, for the bolster remains at the same angle, while the tendency of the spindle is to a less angle. My object is to obviate this liability to variation of spindle and bearing, and allow the spindle to run freely while the bolster is kept in its socket.

To enable others skilled in the art to make and use my invention, I will proceed to describe its construction and operation by explaining the accompanying drawings.

A is the spindle; B, the spindle-rail, which is fixed and holds the step; C, the step; D, the bolster-holder, which has a socket in it for the ball of the bolster, and a hole through the bottom of it a little more than large enough for the cylindrical part of the bolster.

F is the bolster, being the bearing of the spindle, and having a ball not quite large enough to fill the socket in part D. The bolster may be long enough to run nearly to the top of the spindle, and the hole in the middle may be larger, having bearings only at the ends.

G is a screw, the lower part of which is made to fit over the ball of the bolster. It has a hole through it a little more than large enough for the upper cylindrical part of the bolster F. The part G may have a circular top with holes to turn it by, or may be hexagonal or any other convenient form.

H represents packing of cloth, or any other suitable material, placed between the ball and socket to prevent the ball being too firmly bound, and for diminishing the noise of the machine when running.

I is the flier.

J is the skew-bevel, by which the bobbin is revolved.

K is the bevel by which the spindle is turned.

L is the bobbin. (Shown as filled in Figs. 1 and 2.)

I am aware that a contrivance similar in some respects has been used in England. It has a ball to the bolster, and a cup or socket in the bolster-holder for the ball of the bolster to fit in. The bolster-holder is tapped to receive a screw, this screw has its end made small enough to fit losely into a hole in the ball of the bolster; but fitting loosely, as it must, to allow the ball to turn, it is liable to move up and down and rattle when the machine is running.

Having described its construction and operation, what I claim as my invention, and desire to secure by Letters Patent, is—

The ball and socket, with packing and cap-screw, applied to the upper bearings of spindles of speeder or fly frames, essentially as above described.

JOHN C. WHITIN.

Witnesses:
HENRY B. OSGOOD,
P. W. DUDLEY.